Figure 1:
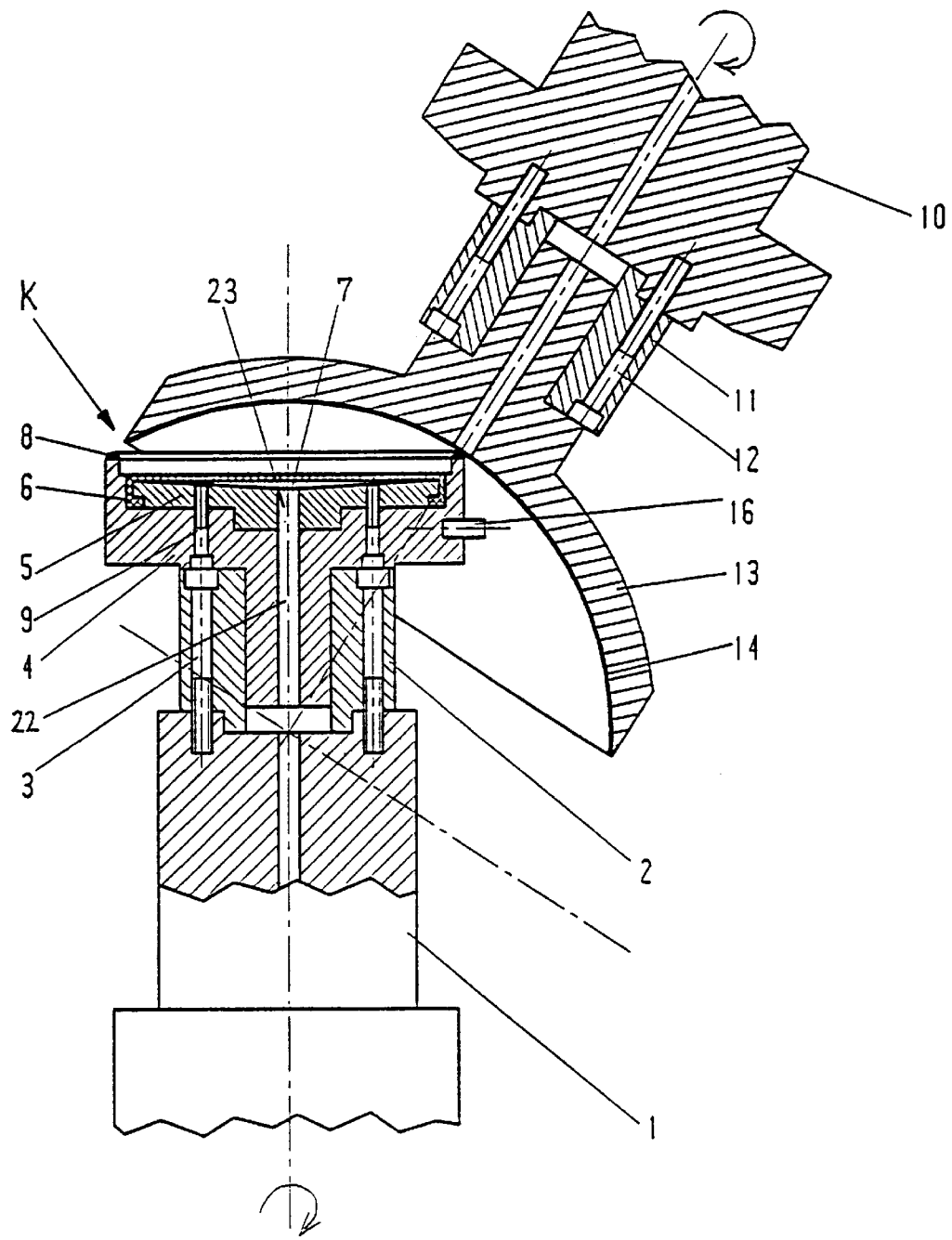

United States Patent

Mandler

Patent Number: 5,951,375
Date of Patent: Sep. 14, 1999

[54] SUPPORT FOR OPTICAL LENSES AND METHOD FOR POLISHING LENSES

[75] Inventor: Roland Mandler, Heuchelheim, Germany

[73] Assignee: Optotech Optikmaschinen GmbH, Wettenberg, Germany

[21] Appl. No.: 08/856,705

[22] Filed: May 15, 1997

[30] Foreign Application Priority Data

May 17, 1996 [EP] European Pat. Off. .............. 96107870

[51] Int. Cl.⁶ .................................................. B24B 13/00
[52] U.S. Cl. ........................... 451/42; 451/443; 451/384; 451/388; 451/56
[58] Field of Search ............................... 451/42, 56, 285, 451/384, 388, 390, 398, 72, 461, 443

[56] References Cited

U.S. PATENT DOCUMENTS

| | | | |
|---|---|---|---|
| 2,133,232 | 10/1938 | Streby | 451/462 |
| 2,541,912 | 2/1951 | Broughton | 451/56 |
| 2,629,975 | 3/1953 | Desenberg | 451/72 |
| 4,669,226 | 6/1987 | Mandler | 451/390 |
| 5,344,261 | 9/1994 | Cliber | 409/132 |
| 5,345,725 | 9/1994 | Anthony | 451/390 |
| 5,357,716 | 10/1994 | Kishida et al. | 451/390 |

FOREIGN PATENT DOCUMENTS

| | | | |
|---|---|---|---|
| 0169931 | 2/1986 | European Pat. Off. | 451/390 |
| A-0 169 931 | 2/1986 | European Pat. Off. | |
| A-294 451 | 10/1991 | Germany | |
| A-07 299 720 | 11/1995 | Japan | |
| A-08 090 403 | 4/1996 | Japan | |

*Primary Examiner*—Robert A. Rose
*Attorney, Agent, or Firm*—Lowe Hauptman Gopstein Gilman & Berner

[57] ABSTRACT

A holder for precision working of optical lenses comprises a cylindrical base (4) designed as a dressing tool, a diaphragm holder (5) fastened thereto, an elastic diaphragm (6) attached air-tight thereto as well as a centric duct (22, 23) crossing the base (4) and the diaphragm holder (5) axially. The dressing tool (4) is preferably a cup-shaped tool to which a lens holder formed as a ring element (15) can be fastened in a capping manner. The lens holder (15) is provided with banking and/or supporting surfaces (21) as well as engaging elements (17) for holding a lens (19) to be worked; moreover, it may be provided with additional dressing elements (18). The dressing tool (4) and the lens holder (15) are combined to a combined tool K which can be fastened to a common rotating machine spindle (1). A polishing tool (13) is first dressed with the cup-shaped tool (4) whereupon the lens holder (15) is mounted and the lens (19) held by it is polished with the dressed polishing tool (13) against which the lens (19) is uniformly pressed by the diaphragm (6).

19 Claims, 3 Drawing Sheets

SUPPORT FOR OPTICAL LENSES AND METHOD FOR POLISHING LENSES

Specification

The invention relates to a holder for optical lenses according to the generic portion of claim 1 and a method of polishing lenses according to the generic portion of claim 15.

The production of optical lenses requires several processing steps. First the lens contour is worked out of a preformed glass blank by coarse grinding in at least one step. Additional fine grinding steps follow in order to give the lens its almost final shape. With spherical lenses, the radius tolerance after fine grinding should be less than 1 to 2 $\mu$. The same applies to asphericity. Normally the spherical cut process or the tangential cup-grinding process is used for fine grinding.

After fine grinding the lens surface will have a peak-to-valley height between 3 and 8 $\mu$, causing the incident light to scatter heavily in all directions. To eliminate this effect, the lens is polished. For this purpose, polishing tools with polisher carriers, e.g. polyurethane foam foils/films which are glued to the polishing tool, are used. The polisher carrier is moved over the surface of the lens to be polished, with a polisher between the gliding surfaces for ensuring the necessary finishing effect.

Originally, polishing was only applied to improve the peak-to-valley height of the surface. But as nowadays increasingly higher demands are made on the accuracy of the lens geometry, the polishing process also serves to correct inaccuracies of the lens radius or faults of asphericity. This applies particularly to industrial applications. Thus polishing is today far more important than it was in the past, for the final and precise shaping of nearly finished lenses can only be achieved by removing material thicknesses of less than 1 $\mu$. Therefore an extremely precise lens geometry can only be obtained through the polishing operation. All other processing steps are too coarse to achieve accuracies in the um range. Consequently the polishing tool is particularly important for modern lens production as it essentially determines the final shape of the lens and thus the quality of the working result.

It is obvious that during polishing, material is not only removed from the surface of the lens to be processes but also from the surface of the polisher carrier. Therefore it is necessary to check the polisher carrier at regular intervals and to dress it if required. This dressing operation requires utmost precision which can only be achieved by special measures.

Usually separate dressing machines with special dressing tools, such as diamond-pellet lined surface tools, are used for dressing the polishing tool. However, the disadvantage of this procedure is that first of all the actual dressing tool has to be given an exact shape in a complicated processing operation before the actual dressing process can take place. But the precision of the dressing tool depends on the precision of the processing tools the faults of which can be easily transmitted to the polishing tool.

It is easier to dress the polishing tool with a so-called cup-shaped tool whose geometry is easily controllable. As is known from DD-A5-294 451, for example, such a dressing device is provided with a pivoted driven spindle receiving the cup-shaped tool and with another, likewise driven spindle receiving the polishing tool to be dressed. A translatory and angular adjustment of the second spindle carrying the polishing tool is possible with regard to the first spindle. Therefore, a circle described by the working surfaces of the cup-shaped dressing tool can be adjusted so as to pass through the center of rotation (passage point of the imagined axis of rotation through the surface of the polisher carrier). Moreover, when the machine has been correctly adjusted, the imagined intersection of the two axes of rotation (axis of the dressing tool and axis of the polishing tool) has to coincide with the center of the spherical segment formed by the polisher carrier. A feeding movement of the polishing tool along its axis makes it possible to uniformly work the complete surface of the polisher carrier.

The lens to be worked is conventionally mounted in a polishing machine by means of a suitable lens holder which is fastened to a driven spindle below the polishing tool. As described e.g. in EP-A1-0 169 931, the lens holder comprises a cylindrical base with an enclosing ring, a diaphragm holder resting on the base, a diaphragm made of elastic material attached thereto as well as a duct system for admission and/or exhaustion of air. The diaphragm supports the lens inserted into the lens holder and forms a cavity together with the diaphragm holder. Via the duct system, compressed air can be admitted to the cavity so that the lens resting on the diaphragm is uniformly pressed against a working tool guided above the lens holder. The lens holder is mounted on a driven spindle and is moved by means of linear feed against the polishing tool for finishing.

Even where modern and precise dressing tools are used, the application of a separate dressing machine involves the fundamental disadvantage that the required accuracy cannot be achieved in many cases because of the change of the polishing tool from the dressing machine to the polishing machine. Even with sophisticated clamping devices it is not possible to exactly reproduce the geometric data when the polishing tool changes from the dressing machine to the polishing machine. Moreover, the use of a separate dressing machine consumes much time owing to the tool change and is thus highly cost-effective.

To avoid the aforementioned disadvantages when using a lens polishing machine and a separate dressing machine, machines and methods have been developed which combine dressing of the polishing tool and polishing of lenses in a single machine. Such machines are equipped with three driven spindles. An upper spindle receives the polishing tool with the polisher carrier pointing downward. A lower spindle receives the dressing tool with the working surfaces pointing upward. A third spindle, also located at the bottom, carries the clamping device for the lens to be polished. The two latter spindles are mounted on a carriage that can be moved transversely to the first spindle so that the dressing tool as well as the clamping device with the lens can be moved below the polishing tool. Since the axis of the polishing tool can be adjusted within a certain angular range from the perpendicular and since vertical feeding is also possible, the polisher carrier of the polishing tool can be dressed with a cup-shaped dressing tool as described. Then the two lower spindles are moved transversely so that the chuck with the lens gets below the polishing tool and the lens can be worked without rechucking the polishing tool.

The problem with such a combined dressing and polishing machine is that it has to perform movements along additional axes, which can only be achieved by means of additional equipment and control. Therefore such machines are complicated and expensive. Moreover, the transverse movement of the two lower spindles has to be extremely precise to exclude inaccuracies which would influence the working result. Nonetheless the position changes of the separately guided tools (dressing tool and lens clamping tool) will inevitably cause inaccuracies and faults of lens geometries.

An important object of the invention is to further improve the polishing process for lenses. In particular the accuracy of the lens geometry is to be increased and the polishing method as a whole is to be simplified. Moreover, the invention aims at substantially reducing time and cost involved in polishing lenses. Yet another objective is the creation of a device suited for optimum processing of optical lenses, the device being designed so as to permit its economical manufacture and convenient handling.

Main features of the invention are stated in the characterizing portions of claims 1, 13 and 15. Further embodiments are dealt with in claims 2 to 12, 14 and 16 to 19.

For problem solution, the invention provides according to claim 1 that in a holder for optical lenses comprising a cylindrical base, an elastic lens support attached thereto and a centric duct crossing the base axially, the base is designed as dressing tool. Thus it is possible to dress the polishing tool directly in the polishing machine by means of the novel lens holder. No tool changing is required, which fact considerably simplifies the polishing operation and handling of the polishing machine. The dressing procedure—as well as the polishing procedure—is performed on one and the same machine which has to be equipped with two driving spindles only: a first one for the polishing tool and a second one for the lens holder with the dressing tool. The machine cost as well as the necessary control is, therefore, considerably reduced. Moreover, as tool changes are dispensed with, there is a marked increase in lens quality results. Inaccuracies owing to position changes or rechucking of tools will not occur.

According to claim 2, the base is a cup-shaped tool ensuring a precise and cheap dressing operation because of the well controllable geometry.

Claim 3 provides that a lens holder formed as a ring element can be attached to the base, which ring element comprises banking and/or supporting surfaces for a lens. By means of the base designed as cup-shaped tool, the polishing tool can be dressed first, with the cup-shaped tool being easily moved to the polishing tool via the spindle guide thereof. Then the lens to be worked can be mounted onto the base by means of the ring element and be submitted to the actual polishing procedure. Mounting of the ring element and insertion of the lens requires only few manipulations. To obtain secure fastening of the lens, the banking and/or supporting surfaces of the ring element are provided with engaging elements according to claim 4, which positively bear against a lens attached thereto. In this way the rotating movement of the spindle will be perfectly transmitted to the lens which is exactly aligned concentrically to the spindle axis. The lens supporting surface provided in the holder ensures optimum contact of the lens with the polishing tool.

In the embodiment of claim 5, the ring element constitutes a lens holder capping the cup-shaped tool. Thus the latter will be protected against dust deposits and/or damage; it will be kept essentially free of dirt. Consequently no cleaning is required when the ring element and the lens are removed so that no unnecessary stoppages will occur. The polishing procedure is performed with extreme efficiency.

In order to be able to make minor modifications or corrections on the polishing tool even during the polishing process, dressing elements are provided on the lens holder according to claim 6. These are employed directly during polishing and will immediately eliminate faults in the polisher geometry.

An important feature is described in claim 7, according to which the lens holder snugly encloses the base. This ensures that the lens holder and the inserted lens are always aligned exactly according to the spindle axis. Position faults caused by changing the lens holder, if any, will be extremely small, entailing a positive effect on the working result.

The feature of claim 8 warrants easy and quick mounting of the lens holder, which is fastened to the base by means of a bayonet joint. Alternatively the lens holder can be fastened to the base by means of screw thread according to claim 9 or by means of a clamping device according to claim 10. At any rate it can be combined with the dressing tool to a single tool, which makes rechucking of the polishing tool from the polishing machine to the dressing machine completely unnecessary. Thus the base and the lens holder form a combined tool which can be used on a conventional polishing machine, for example. No cost for a separate dressing machine has to be spent. Inaccuracies owing to positioning and chucking operations between the machines are also completely excluded. It is of constructional advantage if the elastic lens supporting surface, e.g. a rubber diaphragm, is fastened air-tight according to claim 11 by means of a diaphragm holder mounted on the base, the diaphragm holder being, according to claim 12, provided with a centric through duct connected to the duct in the base.

A holder for optical lenses according to claim 13 is particularly distinguished by the combination of a dressing tool with a lens holder that can be attached to and removed from the dressing tool. The lens holder provides optimum support of the lens and can be removed at any time for a correction of the polisher carrier.

In accordance with claim 14, the dressing tool, e.g. a cup-shaped tool, is mounted on a tool spindle of a polishing or dressing machine. Consequently only a single machine with two spindles is required for the polishing and dressing operations, recuding inter alia the control and cost involved. First the polishing tool can be dressed, and then the lens can be polished with one and the same machine, without inaccuracies of the lens geometry due to a position change of tools.

In a method of producing high-precision lens geometries using an axis-controlled machine with a lens holder for rotationally firm mounting of a lens to be polished, comprising a polishing tool for polishing the lens surface fastened to a rotating tool spindle and a dressing tool for dressing the polishing tool, claim 15 provides that the dressing tool and the lens holder are attached to a common rotating machine spindle. Thus the polishing tool can remain fixed in the spindle for the polishing procedure as well as for the dressing procedure, which simplifies the complete operation considerably. There are no transverse movements of the dressing tool as well as of the lens holder any more so that the related positioning faults are completely excluded. On the contrary, a simplified machine arrangement permits the extremely efficient production of high-precision lens geometries. As unnecessary machine movements are excluded, the method according to the invention is particular economical.

According to claim 16, the polishing tool is dressed with the dressing tool whereupon the lens holder is mounted on the dressing tool and the lens held thereby is polished with the dressed polishing tool. Consequently the complete polishing procedure is performed in a single machine and on a single spindle, respectively. Tool or machine changes become completely unnecessary, which serves to accelerate the polishing procedure considerably. According to claim 18, the polishing tool is advantageously dressed and/or corrected during the polishing procedure, preferably by means of the lens holder in accordance with claim 19. Minor faults of the tool geometry can be eliminated immediately, more or less in on-line operation.

Figure 2:
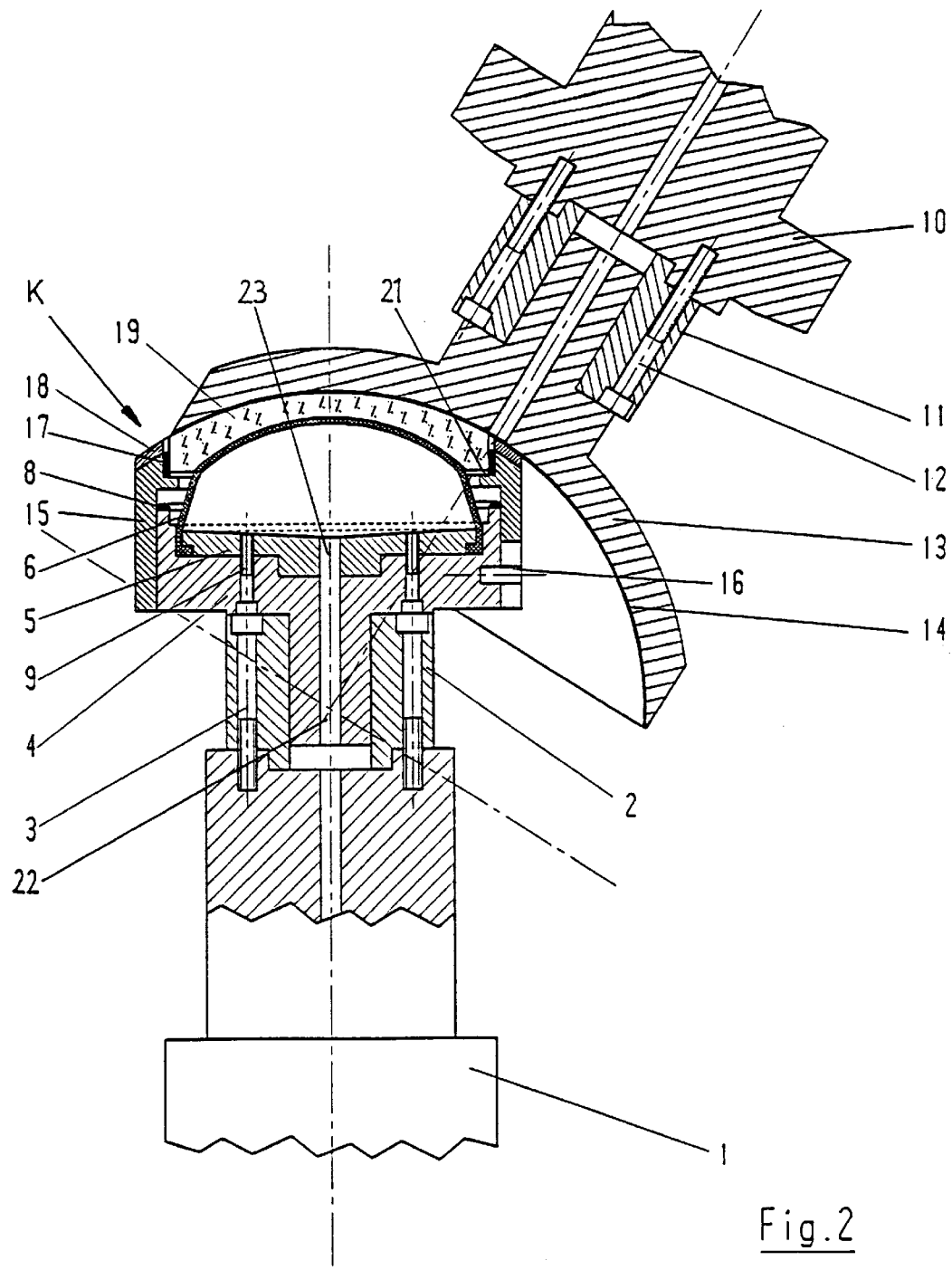
Figure 3:
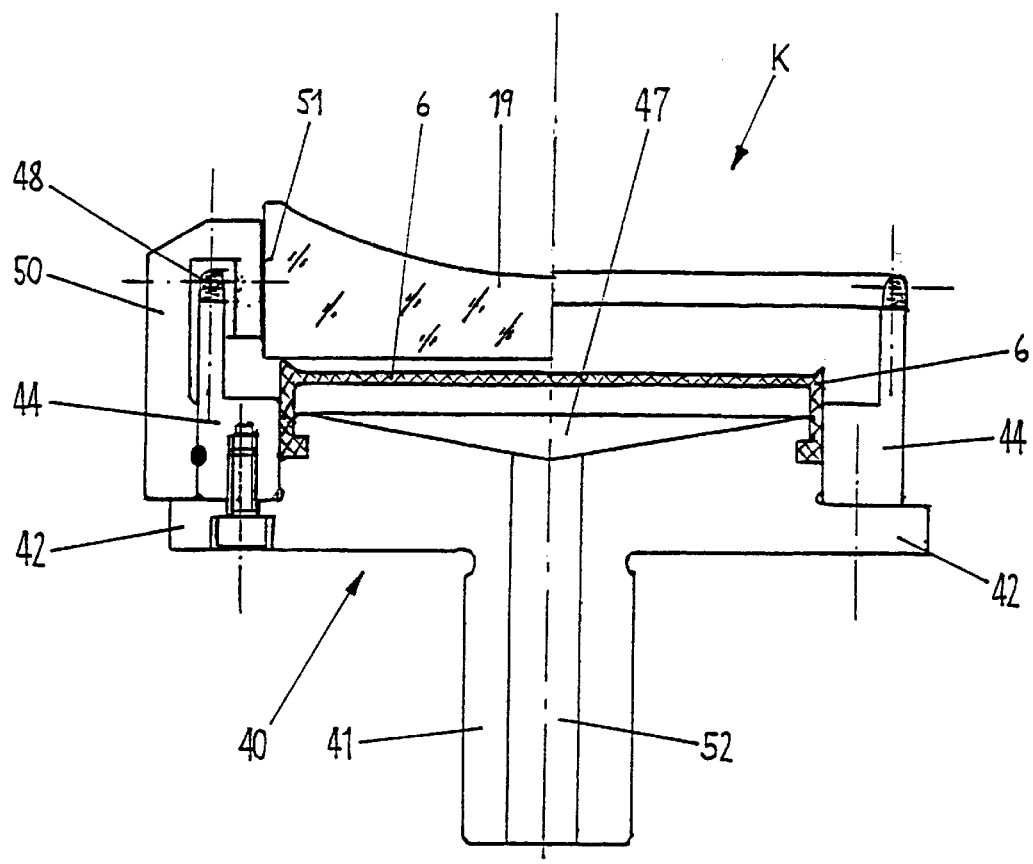

Further features, details and advantages of the invention will be evident from the wording of the claims as well as from the following description of embodiments on the basis of the dreawings wherein: FIG. 1 is a sectional view of a lens holder without ring element, FIG. 2 is a sectional view of a lens holder with a ring element mounted and FIG. 3 is a sectional view of another embodiment of a lens holder.

A holder for optical lenses shown in FIG. 1 is mounted in a polishing machine (not shown) and illustrated during a dressing operation. A tool spindle 1 of the polishing machine is provided at its upper end with an adapter 2 which is fastened to the spindle 1 by means of screws 3. Connected to the adapter 2 is a base 4 having working surfaces 8 at its upper edge, thus forming a cup-shaped dressing tool.

In an inner cylindrical recess of the cup-shaped tool 4, there is a diaphragm holder 5, arranged in a manner known per se, which diaphragm holder 5 is fastened to the cup-shaped tool 4 by means of screws 9. It has a centric concave or synclinal recess 7 and holds a rubber diaphragm 6 resting air-tight on the cup-shaped tool 4 with a fastening edge. Moreover, the cup-shaped tool 4 and the diaphragm holder 5 are provided with centric through holes 22 and 23, respectively, which are connected inside spindle 1 to a compressed-air supply (not shown). The upper end of the through hole 23 in the diaphragm holder 5 ends below the rubber diaphragm 6 in a cavity formed between the vale or recess 7 and the diaphragm 6.

A polishing spindle 10 of the polishing machine is adjusted—according to the geometric data of a lens 19 to be processes—to the tool spindle 1 and carries an adapter 11 screwed to the polishing spindle 10 by means of screws 12. On the adapter 11, a polishing tool 13 with a polisher carrier 14 is mounted the inner recess of which is shaped like a spherical segment. The polisher carrier 14 is dressed and/or corrected on the basis of geometric data with the abutting dressing tool 4 via a machine control system (not shown either).

In FIG. 2 a ring element 15 is provided with a bayonet joint and is held exactly in position by lateral bolts 16 for accurate mounting to the cup-shaped tool 4. Along its inside, the ring element 15 is provided with a supporting surface 21 on which a lens 19 to be worked is mounted concentrically.

The supporting surface 21 can either be continuous or perforated. It is essential that it offers a plane surface so as to hold the lens perfectly. To transmit the rotation of the machine spindle 1 to the lens 19 via the ring element 15 forming a lens holder, engaging elements 17 are provided above the supporting surface 21. These are, for example, elastic projections in positive and frictional contact to the sides of the lens body 19 so that the lens is held concentrically in the ring element 15 and will not rotate when the polishing tool 13 is applied. On its upper surface, the lens holder 15 is provided with additional dressing elements 18 permitting finest corrections of the polishing tool 13 independently of the cup-shaped tool 4, thus ensuring maximum lens quality.

The cup-shaped tool 4, the diaphragm holder 5 and the diaphragm 6 form a combined tool K together with the lens holder 15. This is mounted on only one spindle 1 of a polishing machine and serves for polishing any lens 19 as well as for dressing the polishing tool 13 used for that purpose. Thus the polishing procedure and the dressing procedure are performed in the same machine; tool changes are neither required nor performed.

To dress the polishing tool 13, first of all the polishing tool 13 is mounted on the spindle 10 and the combined tool K with out the lens holder 15 is mounted on the spindle 1. Then the spindles 1, 10 are adjusted relative to each other and by feeding the tool 4, the dressing operation is performed in a manner known per se.

At the end of the dressing procedure, the spindle 1 is moved back with the combined tool K, the spindle 1 being displaced only axially and not transversely. The lens holder 15 is mounted on the cup-shaped tool 4 and is attached by means of the bolts 16. Owing to the precisely fitting design of the cup-shaped tool 4 and of the lens holder 15, the latter rests on the tool exactly centrically so that there will be no lateral position fault. Then the lens 19 to be worked is inserted into the holder 15 and fed to the polishing tool 13 via spindle 1. After this feeding movement, compressed air is admitted to the rubber diaphragm 6 via the coaxial bore 22, whereby it is positively connected to the bottom side of the lens 19 for pressing it uniformly against the surface of the polisher carrier 14. After additon of polisher, polishing can be performed in the usual way. During polishing, the lens 19 is rotated by the engaging elements 17 as well as by the diaphragm 6. Because of the rotation of the two spindles 1, 10 and the resulting relative movement between the polisher carrier 14 and the lens 19, the applied polisher (not visible) will remove the desired amount of material from the lens 19.

FIG. 3 shows a different embodiment of a holder. Here the dressing tool 40 is divided into two parts, viz. a base 41 with an enclosing edge 42 and a tool ring 44 mounted on said edge, the upper edge 48 of the tool ring 44 being designed as cup-shaped tool. Between the base 41 and the cup-shaped ring 44, the diaphragm 6 is anchored by inserting the fastening edge thereof in a peripheral groove of the base 41. Below the diaphragm 6, the base 41 is provided with a recess 47 as well as a centric through hole 52 connected to a compressed-air connection (not shown) in conventional manner.

Around the cup-shaped ring 44, an exactly fitting ring element 50 is mounted the lower end of which is supported by the enclosing edge 42 of the base 41. The upper end of the ring element 50 encloses the upper edge 48 of the cup-shaped ring 44 for forming an inside banking surface 51 for a lens 19 to be worked. The latter is simply inserted into the ring element 50 and held by the diaphragm 6.

The invention is not limited to the embodiments described before but can be modified in many ways. For example, the supporting surface 21 for the lens 19 to be worked may be formed directly in the cup-shaped tool 4, e.g. at its inside. The engaging ring 15 may be fastened to the dressing tool 4 by means of a thread instead of a bayonet joint. Other types of fastening which permit quick fastening and loosening of the engaging ring 15 are also contemplated by the invention.

It will be recognized that a holder for precision working of optical lenses comprises a cylindrical base 4 designed as a dressing tool, a diaphragm holder 5 fastened thereto, an elastic diaphragm 6 attached air-tight thereto as well as a centric duct 22, 23 crossing the base 4 and the diaphragm holder 5 axially. The dressing tool 4 is preferably a cup-shaped tool to which a lens holder formed as a ring element 15 can be fastened in a capping manner. The lens holder 15 is provided with banking and/or supporting surfaces 21 as well as engaging elements 17 for holding a lens 19 to be worked; moreover, it may be provided with additional dressing elements. The dressing tool 4 and the lens holder 15 are combined to a combined tool K which can be fastened to a common rotating machine spindle 1. A polishing tool 13 is first dressed with the cup-shaped tool 4 whereupon the lens holder 15 is mounted and the lens 19 held by it is polished with the dressed polishing tool 13 against which the lens 19 is uniformly pressed by the diaphragm 6.

All and any of the features and advantages of the invention, inclusive of design details and of spatial arrangements, as evident from the claims, from the specification and from the drawings, may be inventionally substantial both per se and in most variegated combinations.

I claim:

1. Holder for optical lenses, comprising a cylindrical base (4), an elastic lens support surface (6) attached thereto as well as a centric duct (22) crossing the base (4) axially, wherein the base (4) is adapted to receive a lens holder formed as a ring element (5) which has supporting surfaces (21) for a lens (19), wherein in the base includes a cup-shaped tool (4) the cup-shaped tool being capped by he ring element (15) constituting the lens holder.

2. Holder for optical lenses, comprising a cylindrical base (4), an elastic lens support surface (6) attached thereto as well as a centric duct (22) crossing the base (4) axially, wherein the base (4) is adapted to receive a lens holder formed as a ring element (15) which has supporting surfaces (21) for a lens (19), wherein the lens holder (15) is fastened to the base (4) by means of a bayonet joint.

3. Method of producing high-precision lens geometries, comprising the steps of using an axis controlled machine with a lens holder (15) for rationally firm mounting of a lens (19) to be worked, using a polishing tool (13) fastened to a rotable polishing spindle (10) of the machine for polishing the lens surface, the machine including a dressing tool (4) for dressing the polishing tool (13), wherein the dressing tool (4) and the lens holder (15) are fastened to a common rotating machine spindle (1).

4. Method according to claim 3, further comprising the step of dressing the polishing tool (13) with the dressing tool (4) whereupon the lens holder (15) is mounted over the dressing tool (4) and the lens (19) is polished with the dressed polishing tool (13).

5. Method according to claim 3, wherein during the polishing procedure, the (19) is uniformly pressed against the polishing tool (13) by an elastic lens supporting surface (6) provided within the dressing tool (4).

6. Method according to claim 3, further comprising the step of dressing and correcting the polishing tool (13) by the lens holder (15) during the polishing procedure.

7. Method according to claim 3, wherein the steps thereof are implemented by sequentially performing the steps of:

mounting the polishing tool 13 onto the polishing spindle (10) and mounting a dressing tool (4) onto the machine spindle (1);

adjusting the spindles (1, 10) relative to each other, feeding the dressing tool (4) towards the polishing tool (13) for dressing the polishing tool;

axially retracting the machine spindle (1);

mounting the lens holder (15) over the dressing tool (4) and attaching the lens holder (15) to the dressing tool (4) by bolts (16) to form a combined tool (K);

inserting the lens (19) to be worked into the lens holder (15);

feeding the combined tool (K) towards the polishing tool (13) via the machine spindle (1);

admitting compressed air to a rubber diaphragm (6) via a coaxial duct (22, 23), whereby the lens (19) is pressed uniformly against the surface of a polisher carrier (14); and polishing the lens (19) thus held on the rotatingly driven lens holder (15) by the polishing tool (13) driven by the rotating polishing spindling (10).

8. A method for precision working of optical lenses comprising the steps of:

first dressing a polishing tool (13) with a cup-shaped tool (4);

mounting a lens holder (15) over the cup-shaped tool;

inserting a lens (19) in the lens holder (15) and polishing the lens (19) with the dressed polishing tool (13) against which the lens (19) is uniformly pressed by a diaphragm (6).

9. Holder for optical lenses, comprising a cup-shaped dressing tool having a cylindrical base (4) which is fixed to a rotating machine spindle (1) and through which a centric duct (22) extends axially, wherein a lens holder (15) is adapted to be removably mounted to the base (4) so as to positively cap and snugly enclose the base thereby to form a combined tool (K) that is mounted to a single rotating machine spindle (1).

10. Holder according to claim 9, wherein the lens holder comprises a ring element (15) having supporting surfaces (21) for concentrically mounting a lens (19) to be worked, said supporting surfaces (21) including plane portions.

11. Holder according to claim 10, wherein the supporting surfaces (21) include engaging elements (17) which positively bear against a lens (19) attached to the ring element.

12. Holder according to claim 9, further comprising dressing elements (18) on the lens holder (15).

13. Holder according to claim 9, wherein the lens holder (15) is threadedly fastened to the base (4) by a screw thread.

14. Holder according to claim 13, wherein the screw thread is formed as a bayonet joint.

15. Holder according to claim 9, further comprising a clamping device for fastening the lens holder (15) to the base (4).

16. Holder according to claim 9, wherein the lens holder (15) includes an elastic lens support surface (6) comprising a rubber diaphragm which is air-tight anchored onto the base (4) by a diaphragm holder (5) having a centric through duct (23) connected to the duct (22) in the base (4).

17. Holder according to claim 16, wherein the base (4), the diaphragm holder (5), the diaphragm (6) and the lens holder (15) together form a combined tool (K) that is mounted on a common rotating spindle (1) and that serves both for polishing a lens (19) and for dressing the polishing tool (13).

18. Holder according to claim 9, wherein the rotating machine spindle (1) is the tool spindle of a polishing or dressing machine.

19. Holder for precision working of optical lenses, comprising a cup-shaped dressing tool having a cylindrical base (4), a diaphragm holder (5) fastened thereto and an elastic diaphragm (6) attached air-tight thereto and a centric duct (22, 23) axially extending through the base (4) and the diaphragm holder (5), wherein a lens holder formed as a ring element (15) is adapted to be mounted onto the base (4) in a capping manner, the lens holder (15) having supporting surfaces (21) and engaging elements (17) for holding a lens (19) to be worked, and wherein the base (4) and the lens holder (15) together form a combined tool (K) fastened to a common rotating machine spindle (1).

* * * * *